United States Patent
Lee et al.

(10) Patent No.: US 9,331,831 B2
(45) Date of Patent: May 3, 2016

(54) METHOD FOR RECEIVING OR TRANSMITTING DOWNLINK SIGNALS AND APPARATUS THEREFOR

(71) Applicant: LG ELECTRONICS INC., Seoul (KR)

(72) Inventors: Jihyun Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 49 days.

(21) Appl. No.: 14/383,052

(22) PCT Filed: Mar. 15, 2013

(86) PCT No.: PCT/KR2013/002103
§ 371 (c)(1),
(2) Date: Sep. 4, 2014

(87) PCT Pub. No.: WO2013/137680
PCT Pub. Date: Sep. 19, 2013

(65) Prior Publication Data
US 2015/0036652 A1    Feb. 5, 2015

Related U.S. Application Data

(60) Provisional application No. 61/611,018, filed on Mar. 15, 2012.

(51) Int. Cl.
*H04L 5/00* (2006.01)
*H04L 1/00* (2006.01)
*H04L 1/18* (2006.01)

(52) U.S. Cl.
CPC ............ *H04L 5/0048* (2013.01); *H04L 5/0057* (2013.01); *H04L 1/0031* (2013.01); *H04L 1/1861* (2013.01); *H04L 5/0005* (2013.01)

(58) Field of Classification Search
CPC .......................... H04L 5/0048; H04L 5/0057
USPC ........................................................ 370/330
See application file for complete search history.

(56) References Cited

U.S. PATENT DOCUMENTS

| 2012/0039220 A1 | 2/2012 | Chen et al. |
| 2013/0215842 A1* | 8/2013 | Han .................... H04W 72/042 370/329 |

FOREIGN PATENT DOCUMENTS

WO    WO 2011/115421 A2    9/2011

OTHER PUBLICATIONS

Fujitsu, "Zero-power and non-zero power CSI-RS configurations", 3GPP TSG-RAN WG1 #68, Dresden, Germany, Feb. 6-10, 2012, R1-120755, 6 pages.

(Continued)

*Primary Examiner* — Melvin Marcelo
*Assistant Examiner* — Peter Solinsky
(74) *Attorney, Agent, or Firm* — Birch, Stewart, Kolasch & Birch, LLP

(57) ABSTRACT

Disclosed is a method for receiving downlink signals in a wireless communication system, the method comprising: receiving downlink signal from a base station and detecting the downlink signal, wherein the detecting the downlink signal includes, if the number of resource elements (REs) to which channel state information-reference signal (CSI-RS) in a downlink subframe is mapped is smaller than the number of the enhanced control channel elements (eCCEs) for an enhanced physical downlink control channel (EPDCCH) in the downlink subframe, assuming REs, the number of which corresponds to a difference value between the number of eCCEs and the number of REs, which are included in the EPDCCH, as a zero-power CSI-RS, wherein the REs assumed as the zero-power CSI-RS is included in an eCCE that does not comprise the REs to which the CSI-RS is mapped.

12 Claims, 23 Drawing Sheets

(56) References Cited

OTHER PUBLICATIONS

Renesas Mobile Europe Ltd et al., "Correction on overlapping non-zero-power and zero-power CSI-RS configurations", 3GPP TSG-RAN WGl Meeting #65, Barcelona, Spain, May 9-13, 2011, R1-111559, 5 pages.

Texas Instruments, "Transmit-side Signalling Enhancements Targeting Het-Nets for Rel-11", 3GPP TSG RAN WG1 Meeting #66bis, Zhuhai, China, Oct. 10-14, 2011, R1-113244, 8 pages.

* cited by examiner

FIG. 8

Extended CP (a)

Extended CP (b)

Extended CP

FIG. 13

Extended CP

FIG. 14

Extended CP

Extended CP

Extended CP

FIG. 18

Extended CP

METHOD FOR RECEIVING OR TRANSMITTING DOWNLINK SIGNALS AND APPARATUS THEREFOR

CROSS REFERENCE TO RELATED APPLICATIONS

This application is the national phase of PCT/KR2013/002103 filed on Mar. 15, 2013, which claims priority under 35 U.S.C. 119(e) to U.S. Provisional Application No. 61/611,018 filed on Mar. 15, 2012, all of which are incorporated by reference herein in its entirety.

TECHNICAL FIELD

The present invention relates to a wireless communication system, and more particularly, to a method for receiving or transmitting downlink signals in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for transmitting and receiving downlink signals in a wireless communication system.

Another object of the present invention provides a method for effectively allocating time and frequency resources of downlink signals during transmission and reception of the downlink signals in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for receiving downlink signals in a wireless communication system, the method including receiving downlink signal from a base station and detecting the downlink signal, wherein the detecting the downlink signal includes, if the number of resource elements (REs) to which channel state information-reference signal (CSI-RS) in a downlink subframe is mapped is smaller than the number of the enhanced control channel elements (eCCEs) for an enhanced physical downlink control channel (EPDCCH) in the downlink subframe, assuming REs, the number of which corresponds to a difference value between the number of eCCEs and the number of REs, which are included in the EPDCCH, as a zero-power CSI-RS, wherein the REs assumed as the zero-power CSI-RS is included in an eCCE that does not comprise the REs to which the CSI-RS is mapped.

Additionally or alternatively, the REs to which the CSI-RS is mapped and the REs assumed as the zero-power CSI-RS may be equally allocated to all eCCEs.

Additionally or alternatively, the REs assumed as the zero-power CSI-RS may be mapped to a location obtained by cyclic shifting a location of the REs to which the CSI-RS is mapped by as much as a predetermined distance in a time-frequency direction.

Additionally or alternatively, the REs assumed as the zero-power CSI-RS may be mapped to remaining REs obtained by excluding the REs to which the CSI-RS is mapped, from REs for a specific CSI-RS configuration including the REs to which the CSI-RS is mapped.

Additionally or alternatively, information about a location of the REs assumed as the zero-power CSI-RS may be received via higher layer signaling.

In another aspect of the present invention, provided herein is a method for transmitting downlink signals in a wireless communication system, wherein the transmitting the downlink signal includes: if the number of resource elements (REs) to which channel state information-reference signal (CSI-RS) in a downlink subframe is mapped is smaller than the number of the enhanced control channel elements (eCCEs) for an enhanced physical downlink control channel (EPDCCH) in the downlink subframe, configuring REs, the number of which corresponds to a difference value between the number of eCCEs and the number of REs included in the EPDCCH, as a zero-power CSI-RS, wherein the REs configured as the zero-power CSI-RS are included in an eCCE that does not comprise the REs to which the CSI-RS is mapped.

In another aspect of the present invention, provided herein is a user equipment (UE) configured to receive downlink signals in a wireless communication system, the UE including a radio frequency (RF) unit, and a processor configured to control the RF unit, wherein the processor is configured to receive downlink signal from a base station and detects the downlink signal, and the processor is configured to: if the number of resource elements (REs) to which channel state information-reference signal (CSI-RS) in a downlink subframe is mapped is smaller than the number of the enhanced control channel elements (eCCEs) for an enhanced physical downlink control channel (EPDCCH) in the downlink subframe, assume REs, the number of which corresponds to a difference value between the number of eCCEs and the number of REs, which are included in the EPDCCH, as a zero-power CSI-RS; and wherein the REs assumed as the zero-power CSI-RS is included in an eCCE that does not comprise the REs to which the CSI-RS is mapped.

Additionally or alternatively, the REs to which the CSI-RS is mapped and the REs assumed as the zero-power CSI-RS may be equally allocated to all eCCEs.

Additionally or alternatively, the REs assumed as the zero-power CSI-RS may be mapped to a location obtained by cyclic shifting a location of the REs to which the CSI-RS is mapped by as much as a predetermined distance in a time-frequency direction.

Additionally or alternatively, the REs assumed as the zero-power CSI-RS may be mapped to remaining REs obtained by excluding the REs to which the CSI-RS is mapped, from REs for a specific CSI-RS configuration including the REs to which the CSI-RS is mapped.

Additionally or alternatively, information about a location of the REs assumed as the zero-power CSI-RS may be received via higher layer signaling.

In another aspect of the present invention, provided herein is a base station configured to transmit downlink signals in a wireless communication system, the base station including a radio frequency (RF) unit, and a processor configured to control the RF unit, wherein the processor is configured to transmit downlink signal to a user equipment (UE), and the processor is configured to: if the number of resource elements (REs) to which channel state information-reference signal (CSI-RS) in a downlink subframe is mapped is smaller than the number of the enhanced control channel elements (eCCEs) for an enhanced physical downlink control channel (EPDCCH) in the downlink subframe, configure REs, the number of which corresponds to a difference value between the number of eCCEs and the number of REs included in the EPDCCH as a zero-power CSI-RS; and wherein the REs configured as the zero-power CSI-RS is included in an eCCE that does not comprise the REs to which the CSI-RS is mapped.

It is to be understood that both the foregoing general description and the following detailed description of the present invention are exemplary and explanatory and are intended to provide further explanation of the invention as claimed.

Advantageous Effects

According to an embodiment of the present invention, downlink signals can be effectively transmitted and received in a wireless communication system.

According to an embodiment of the present invention, time and frequency resources of downlink signals can be effectively allocated during transmission and reception of the downlink signals in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 8 illustrates a pattern of a cell-specific reference signal (CRS) and/or a pattern of a demodulation reference signal (DMRS);

FIG. 13 are patterns of a CRS, a DMRS, and a CSI-RS;

FIG. 14 illustrates an example of an enhanced control channel element (eCCE) partitioning operation in an EPDDCH and RE allocation for CSI-RS transmission for each eCCE;

FIG. 18 illustrates a reuse pattern of a CSI-RS;

BEST MODE

Figure 1:
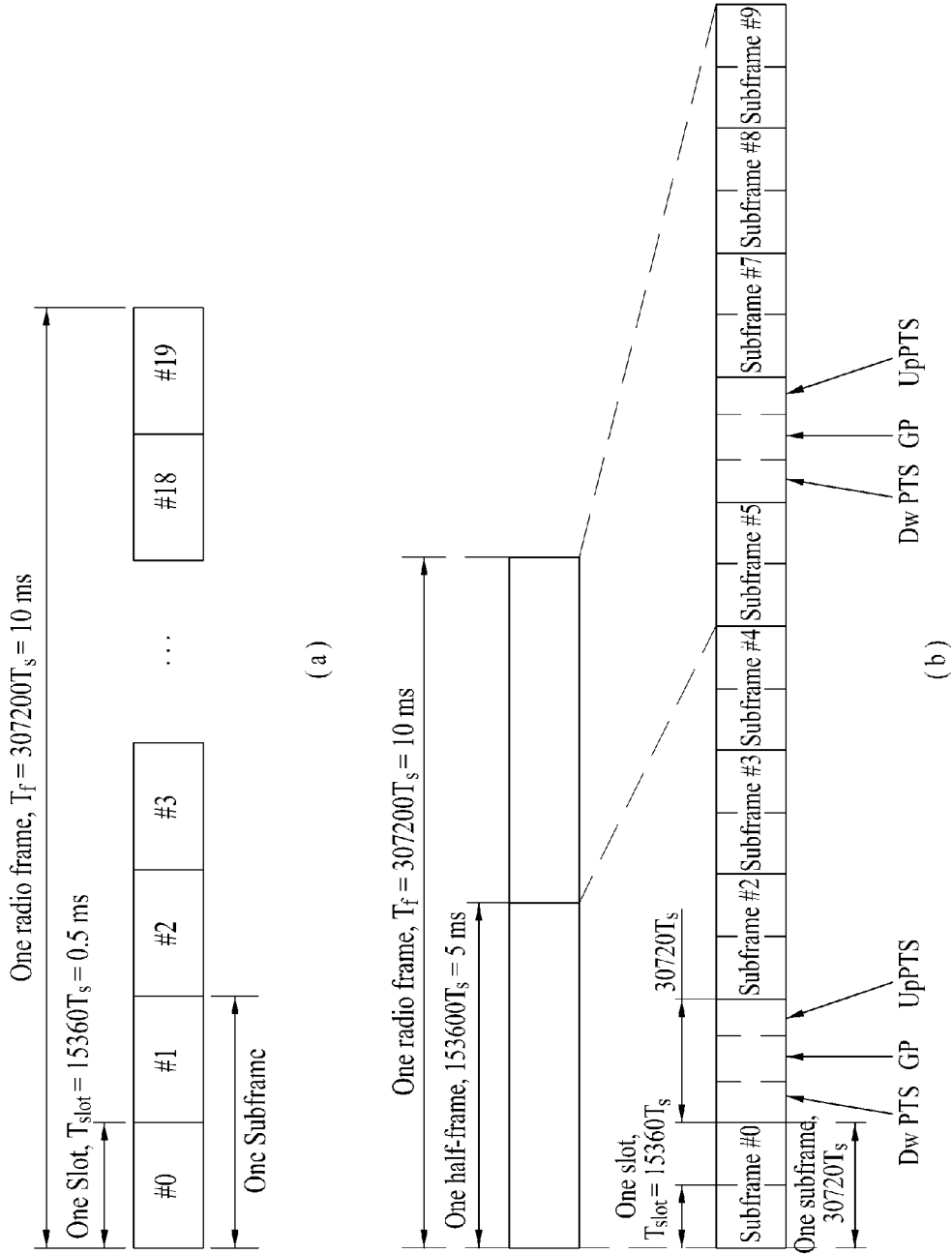
FIG. 1 illustrates exemplary radio frame structures in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3 GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
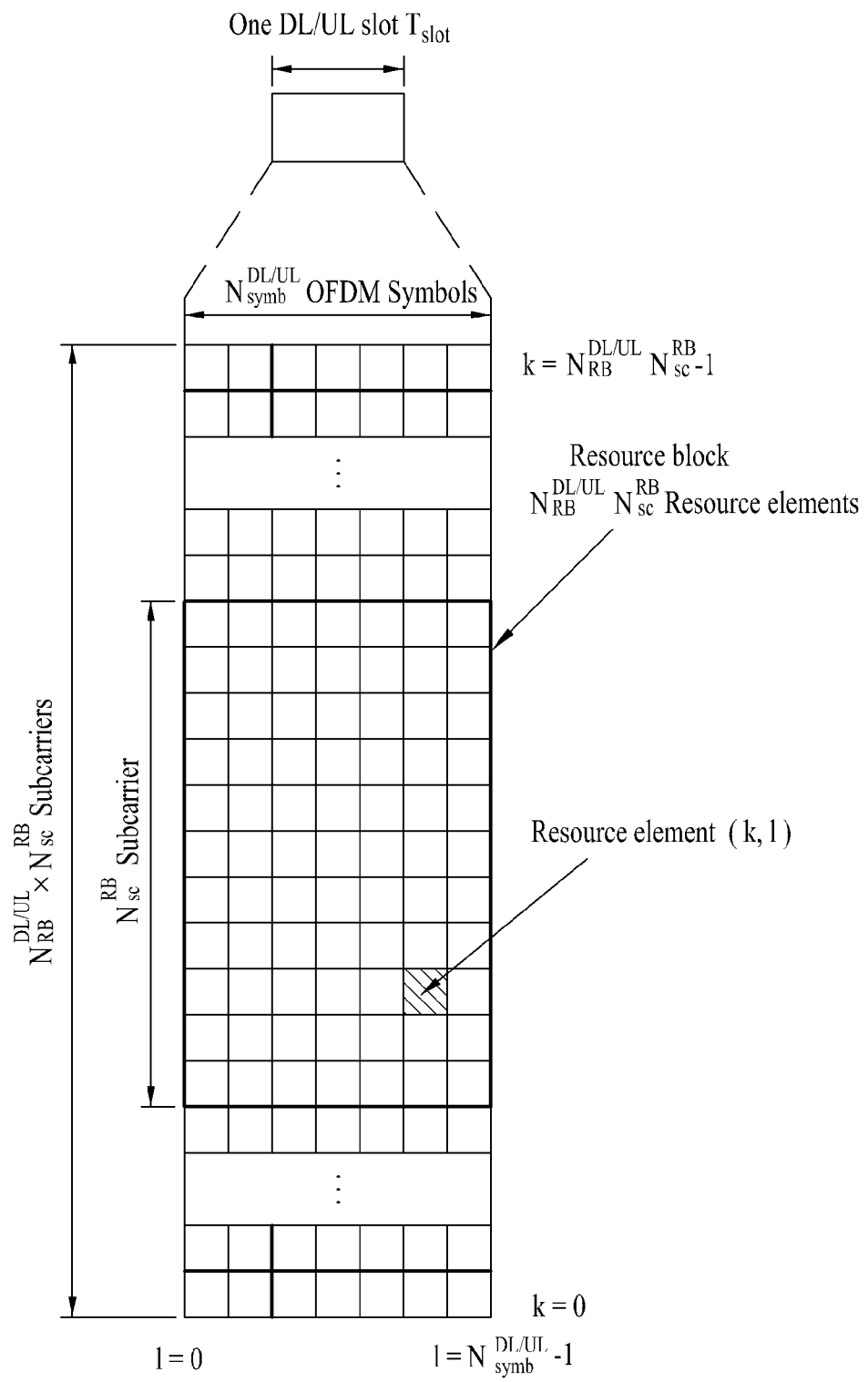
FIG. 2 illustrates an exemplary downlink (DL)/uplink (UL) slot structure in a radio communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}*N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
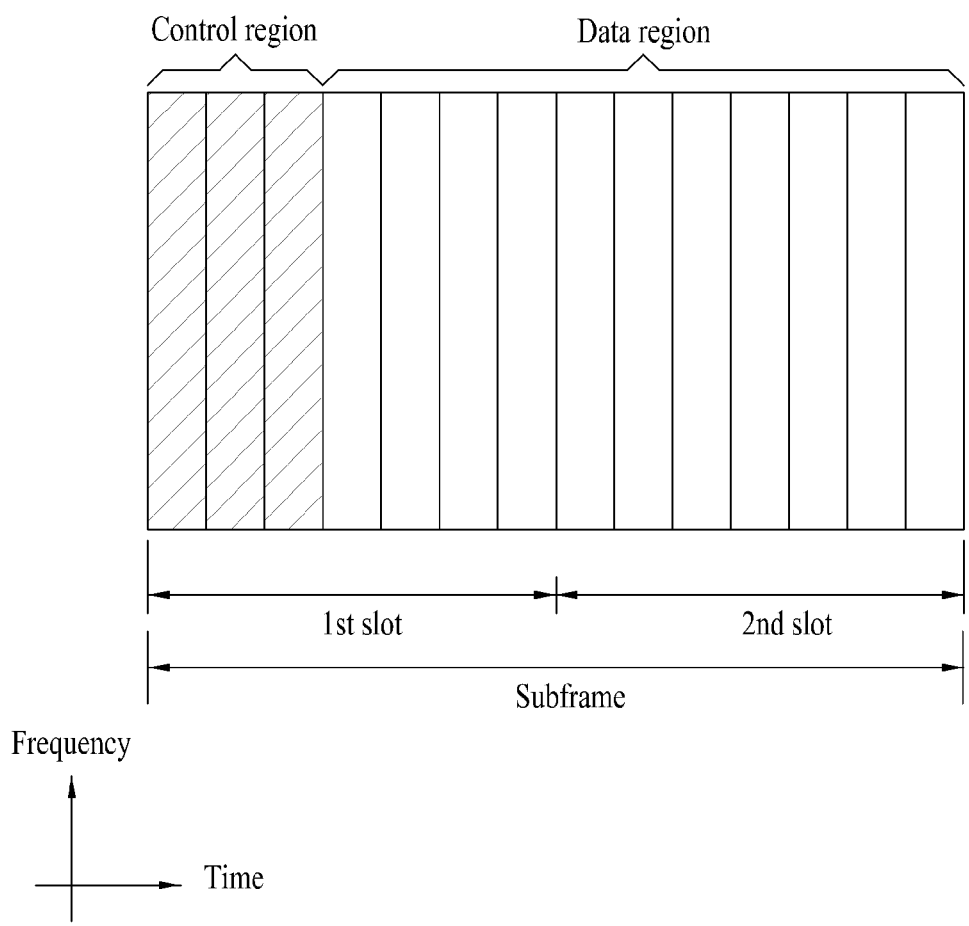
FIG. 3 illustrates a structure of a DL subframe in a 3$^{rd}$ generation partnership project long term evolution-Advanced (3GPP LTE(-A)) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
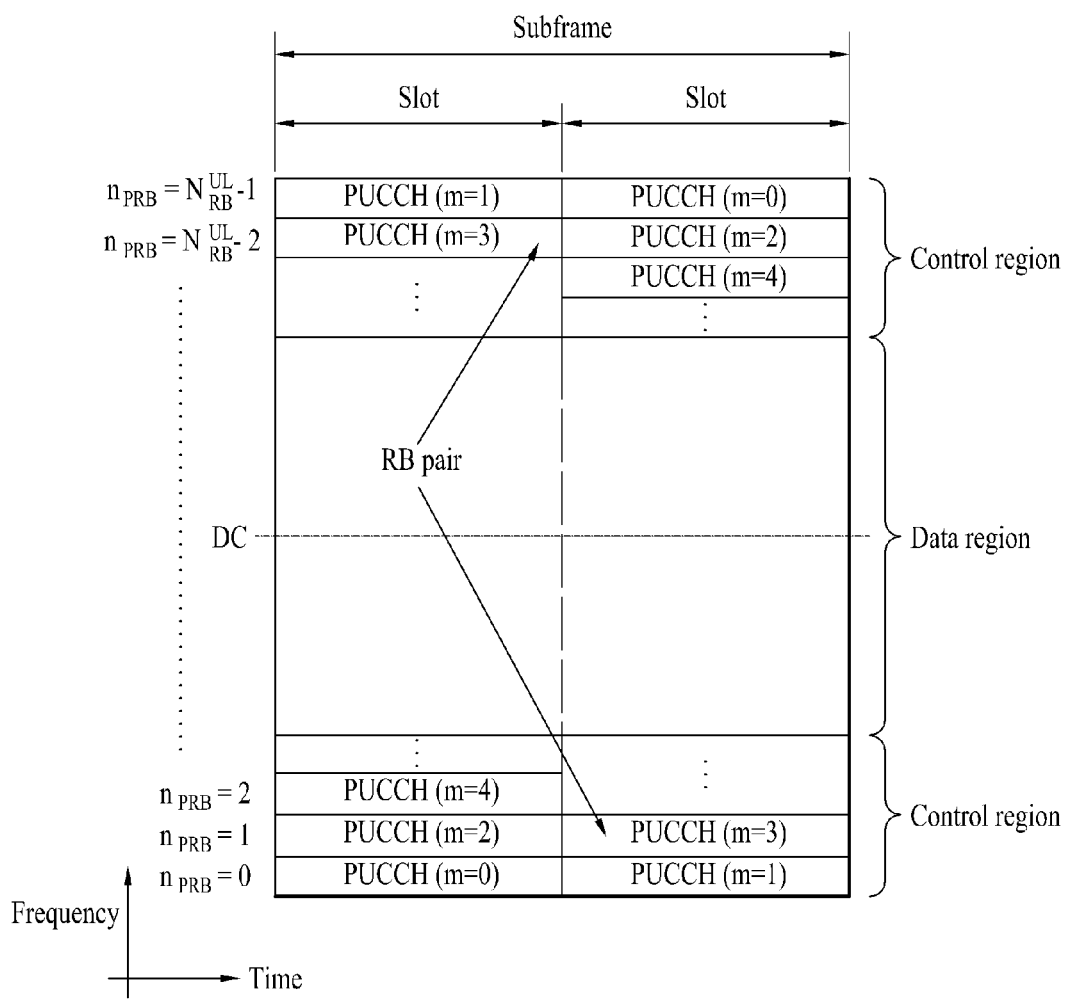
FIG. 4 illustrates the structure of a UL subframe in a 3GPP LTE(-A) system.

FIG. 4 is a diagram showing an example of an uplink subframe structure used in a 3GPP LTE(-A) system.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data. The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Channel State Information-Reference Signal (CSI-RS)

Figure 5:
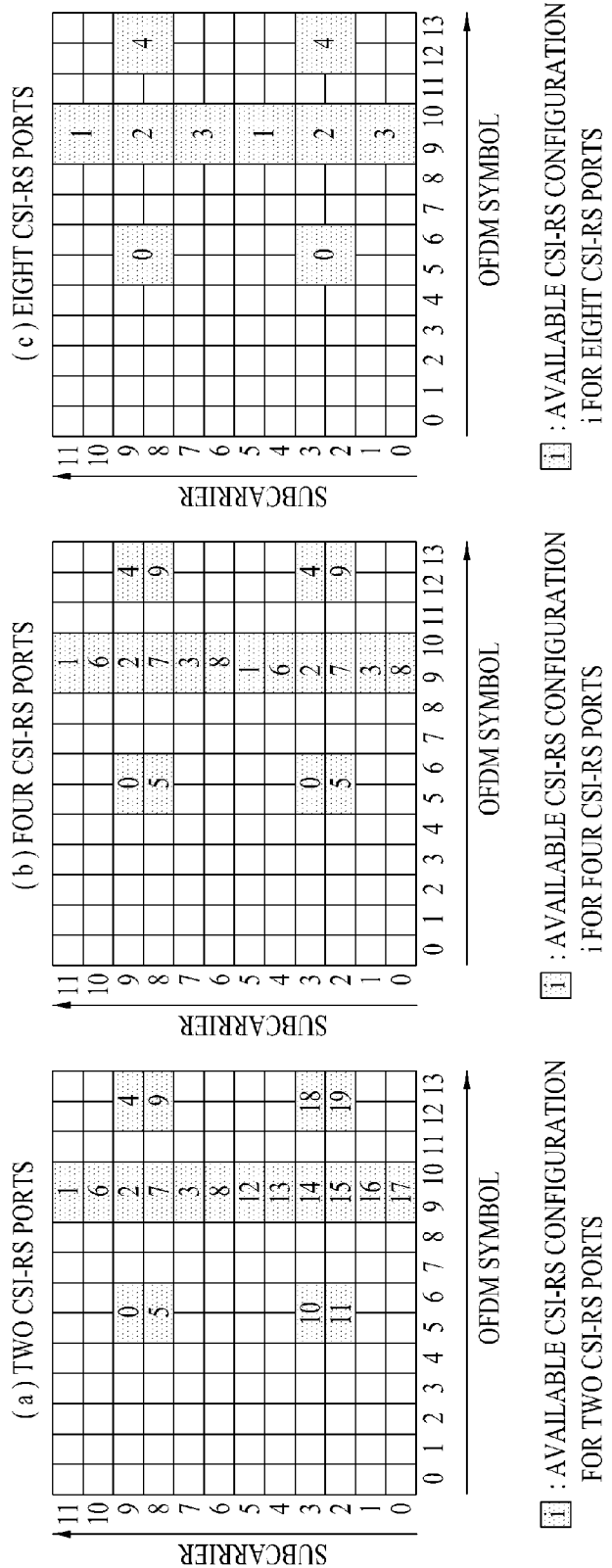
FIG. 5 illustrates exemplary channel state information reference signal (CSI-RS) configurations.

FIG. 5 illustrates CSI-RS mapping patterns according to antenna ports. An antenna port for CSI-RS transmission is referred to as a CSI-RS port and positions of resources in a predetermined resource region, in which CSI-RSs are transmitted through CSI-RS ports corresponding thereto, are referred to as a CSI-RS pattern or CSI-RS resource configuration. In addition, a time-frequency resource to/through which a CSI-RS is allocated/transmitted is referred to as a CSI-RS resource. For example, a resource element (RE) used for CSI-RS transmission is referred to as a CSI-RS RE. While the position of an RE through which a CRS is transmitted per antenna port is fixed, the CSI-RS has a maximum of 32 different configurations in order to reduce inter-cell interference (ICI) in a multi-cell environment including a heterogeneous network environment. A CSI-RS configuration depends on the number of antenna ports in a cell and CSI-RS configurations are set such that neighboring cells have different configurations. The CSI-RS supports up to 8 antenna ports (p=15, p=15, 16, p=15, . . . , 18 and p=15, . . . , 22), distinguished from the CRS, and is defined for $\Delta f=15$ kHz only. Antenna ports p=15, . . . , 22 may respectively correspond to CSI-RS ports p=0, . . . , 7 in the following description.

Tables 3 and 4 show CSI-RS configurations that can be used in a frame structure (referred to as FS-1 hereinafter) for FDD (frequency division duplex) and a frame structure (referred to as FS-2 hereinafter) for TDD (time division duplex). Particularly, Table 3 shows CSI-RS configurations in a subframe having the normal CP and Table 4 shows CSI-RS configurations in a subframe having the extended CP.

TABLE 3

| | | Number of CSI-RSs configured | | | | | |
|---|---|---|---|---|---|---|---|
| | CSI-RS | 1 or 2 | | 4 | | 8 | |
| | configuration | (k', l') | $n_s$mod2 | (k', l') | $n_s$mod2 | (k', l') | $n_s$mod2 |
| FS-1 and FS-2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 3-continued

| | | Number of CSI-RSs configured | | | | | |
|---|---|---|---|---|---|---|---|
| | CSI-RS | 1 or 2 | | 4 | | 8 | |
| | configuration | (k', l') | n$_s$mod2 | (k', l') | n$_s$mod2 | (k', l') | n$_s$mod2 |
| FS-2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 4

| | | Number of CSI-RSs configured | | | | | |
|---|---|---|---|---|---|---|---|
| | CSI-RS | 1 or 2 | | 4 | | 8 | |
| | configuration | (k', l') | n$_s$mod2 | (k', l') | n$_s$mod2 | (k', l') | n$_s$mod2 |
| FS-1 and FS-2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS-2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

When (k', l') (k' being a subcarrier index in a resource block and l' being an OFDM symbol index in a slot) in Tables 4 and 5 and $n_s$ ($n_s$ being a slot index in a frame) are applied to the following equation, a time-frequency resource used by each CSI-RS port to transmit a corresponding CSI-RS can be determined That is, a CSI-RS sequence may be mapped to complex-valued modulation symbols used as reference symbols for CSI-RS port p in slot $n_s$ in a subframe (CSI-RS subframe) configured for CSI-RS transmission according to the following equation.

$$a_{k,l}^{(p)} = w_{l''} \cdot r_{l,n_s}(m') \quad \text{[Equation 1]}$$

In Equation 1, a resource index pair (k, l) (k being a subcarrier index and l being an OFDM symbol index in a subframe) used for CSI-RS port p for CSI-RS transmission can be determined according to the following equation.

$$k = k' + 12m + \begin{cases} -0 & \text{for } p \in \{0, 1\}, \text{ normal cyclic prefix} \\ -6 & \text{for } p \in \{2, 3\}, \text{ normal cyclic prefix} \\ -1 & \text{for } p \in \{4, 5\}, \text{ normal cyclic prefix} \\ -7 & \text{for } p \in \{6, 7\}, \text{ normal cyclic prefix} \\ -0 & \text{for } p \in \{0, 1\}, \text{ extended cyclic prefix} \\ -3 & \text{for } p \in \{2, 3\}, \text{ extended cyclic prefix} \\ -6 & \text{for } p \in \{4, 5\}, \text{ extended cyclic prefix} \\ -9 & \text{for } p \in \{6, 7\}, \text{ extended cyclic prefix} \end{cases} \quad \text{[Equation 2]}$$

-continued $$l = l' + \begin{cases} l'' & \begin{array}{l}\text{CSI reference signal configurations } 0-19, \\ \text{normal cyclic prefix}\end{array} \\ 2l'' & \begin{array}{l}\text{CSI reference signal configurations } 20-31, \\ \text{normal cyclic prefix}\end{array} \\ l'' & \begin{array}{l}\text{CSI reference signal configurations } 0-27, \\ \text{extended cyclic prefix}\end{array} \end{cases}$$

$$w_{l''} = \begin{cases} 1 & p \in \{0, 1, 2, 3\} \\ (-1)^{l''} & p \in \{4, 5, 6, 7\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

FIG. 5 illustrates CSI-RS configurations. Particularly, FIG. 5 illustrates CSI-RS configurations according to Equation 1 and Table 3 and shows positions of resources occupied by CSI-RSs in one RB pair in each CSI-RS configuration.

FIG. 5(a) shows 20 CSI-RS configurations available for CSI-RS transmission through 2 CSI-RS ports, FIG. 5(b) shows 10 CSI-RS configurations available for CSI-RS transmission through 4 CSI-RS ports and FIG. 5(c) shows 5 CSI-RS configurations available for CSI-RS transmission through 8 CSI-RS ports. CSI-RS configurations defined on the basis of the number of CSI-RS ports may be numbered.

When a BS sets 2 antenna ports for CSI-RS transmission, that is, sets 2 CSI-RS ports, CSI-RS transmission is performed in a radio resource corresponding to one of the 20 CSI-RS configurations, shown in FIG. 5(a), through the 2 CSI-RS ports. When 4 CSI-RS ports are set for a specific cell, CSI-RSs are transmitted in resources corresponding to CSI-RS configurations for the specific cell from among the 10 CSI-RS configurations, shown in FIG. 5(b), through the 4 CSI-RS ports. When 8 CSI-RS ports are set for the specific cell, CSI-RSs are transmitted in resources corresponding to CSI-RS configurations for the specific cell from among the 5 CSI-RS configurations, shown in FIG. 5(c), through the 8 CSI-RS ports.

CSI-RS configurations shown in Tables 3 and 4 have a nested property. The nested property means that a CSI-RS configuration for a large number of CSI-RS ports becomes a super set of a CSI-RS configuration for a small number of CSI-RS ports. Referring to FIGS. 5(b) and 5(c), REs corresponding to CSI-RS configuration 0 with respect to 4 CSI-RS ports are included in resources corresponding to CSI-RS configuration 0 with respect to 8 CSI-RS ports.

A plurality of CSI-RSs may be used in a predetermined cell. In case of a non-zero power CSI-RS, only a CSI-RS with respect to one CSI-RS configuration is transmitted. In case of a zero power CSI-RS, a CSI-RS with respect to a plurality of CSI-RS configurations may be transmitted. A UE assumes zero transmission power for resources other than resources that need to be assumed to correspond to non-zero power CSI-RSs, from among resources corresponding to zero power CSI-RSs. For example, with regard to a radio frame for TDD, a CSI-RS is not transmitted in a special subframe in which downlink transmission and uplink transmission coexist, a subframe in which a paging message is transmitted and a subframe in which transmission of a synchronization signal, a physical broadcast channel (PBCH) or system information block type 1 (SIB1) collide with a CSI-RS, and the UE assumes that a CSI-RS is not transmitted in these subframes.

A time-frequency resource used for a CSI-RS port to transmit the corresponding CSI-RS is not used for PDSCH transmission through any antenna port and is not used for CSI-RS transmission through an antenna port other than the corresponding CSI-RS port.

Since time-frequency resources used for CSI-RS transmission cannot be used for data transmission, data throughput decreases as CSI-RS overhead increases. In view of this, a CSI-RS is configured to be transmitted at a predetermined transmission interval corresponding to a plurality of subframes rather than being configured to be transmitted per subframe. In this case, CSI-RS transmission overhead can be remarkably reduced compared to a case in which the CSI-RS is transmitted per subframe. In the following description, a subframe configured for CSI-RS transmission is referred to as a CSI-RS subframe. A subframe configured for CSI-RS transmission may be defined by CSI-RS transmission periodicity and subframe offset. The CSI-RS transmission periodicity and subframe offset are referred to as a CSI-RS subframe configuration. Table 5 shows CSI-RS transmission periodicity $T_{CSI-RS}$ and subframe offset $\Delta_{CSI-RS}$.

TABLE 5

| CSI-RS subframe configuration $I_{CSI-RS}$ | CSI-RS periodicity $T_{CSI-RS}$ (subframes) | CSI-RS subframe offset $\Delta_{CSI-RS}$ (subframes) |
|---|---|---|
| $I_{CSI-RS} \leq 4$ | 5 | $I_{CSI-RS}$ |
| $5 \leq I_{CSI-RS} \leq 14$ | 10 | $I_{CSI-RS} - 5$ |
| $15 \leq I_{CSI-RS} \leq 34$ | 20 | $I_{CSI-RS} - 15$ |
| $35 \leq I_{CSI-RS} \leq 74$ | 40 | $I_{CSI-RS} - 35$ |
| $75 \leq I_{CSI-RS} \leq 154$ | 80 | $I_{CSI-RS} - 75$ |

In Table 5, $I_{CSI-RS}$ specifies CSI-RS transmission periodicity and subframe offset.

The BS may determine or adjust $I_{CSI-RS}$ and transmit $I_{CSI-RS}$ to UEs within the coverage of the corresponding cell. A UE may be aware of a CSI-RS subframe in which a CSI-RS of the cell (referred to as a serving cell, hereinafter) that provides communication services to the UE is transmitted on the basis of $I_{CSI-RS}$. The UE may determine a subframe which satisfies the following equation as a CSI-RS subframe.

$$(10n_f + \lfloor n_s/2 \rfloor - \Delta_{CSI-RS}) \bmod T_{CSI-RS} = 0 \quad \text{[Equation 3]}$$

Here, $n_f$ denotes a system frame number and $n_s$ represents a slot number of a radio frame.

For example, referring to Table 6, when $I_{CSI-RS}$ is greater than 5 and less than 14, a CSI-RS is transmitted every 10 subframes, starting from a subframe corresponding to a subframe number $I_{CSI-RS} - 5$.

The BS may notify the UE of the following parameters through higher layer signaling (e.g. medium access control (MAC) signaling or radio resource control (RRC) signaling).

Number of CSI-RS ports
CSI-RS configuration (refer to Tables 4 and 5, for example)
CSI-RS subframe configuration (refer to Table 6, for example)
CSI-RS subframe configuration periodicity $T_{CSI-RS}$
CSI-RS subframe offset $\Delta_{CSI-RS}$ The BS may notify the UE of a CSI-RS configuration transmitted with zero power and a subframe configuration for transmission of a zero power CSI-RS as necessary. The CSI-RS configurations of Tables 5 and 6 may be used as the zero power CSI-RS configuration and the CSI-RS subframe configuration of Table 6 may be used as the subframe configuration for transmission of the zero power CSI-RS.

Enhanced PDCCH (EPDCCH)

By virtue of the introduction of a multimode system, although various communication schemes can be applied to enhance channel quality, a new control channel needs to be introduced in order to apply the aforementioned MIMO scheme and inter-cell cooperative communication scheme to a multiple node environment. Due to this need, an Enhanced-PDCCH as a control channel has been newly introduced and is determined to be allocated to a data region (hereinafter, referred to as a PDSCH region) that is not a legacy control region (hereinafter, referred to as a PDCCH region). Consequently, control information about a node for each UE can be transmitted through the EPDCCH and thus a problem in terms of a depleted legacy PDCCH region can also be overcome. For reference, an EPDCCH is not transmitted to a legacy UE and can be received by only a LTE-A UE.

Figure 6:
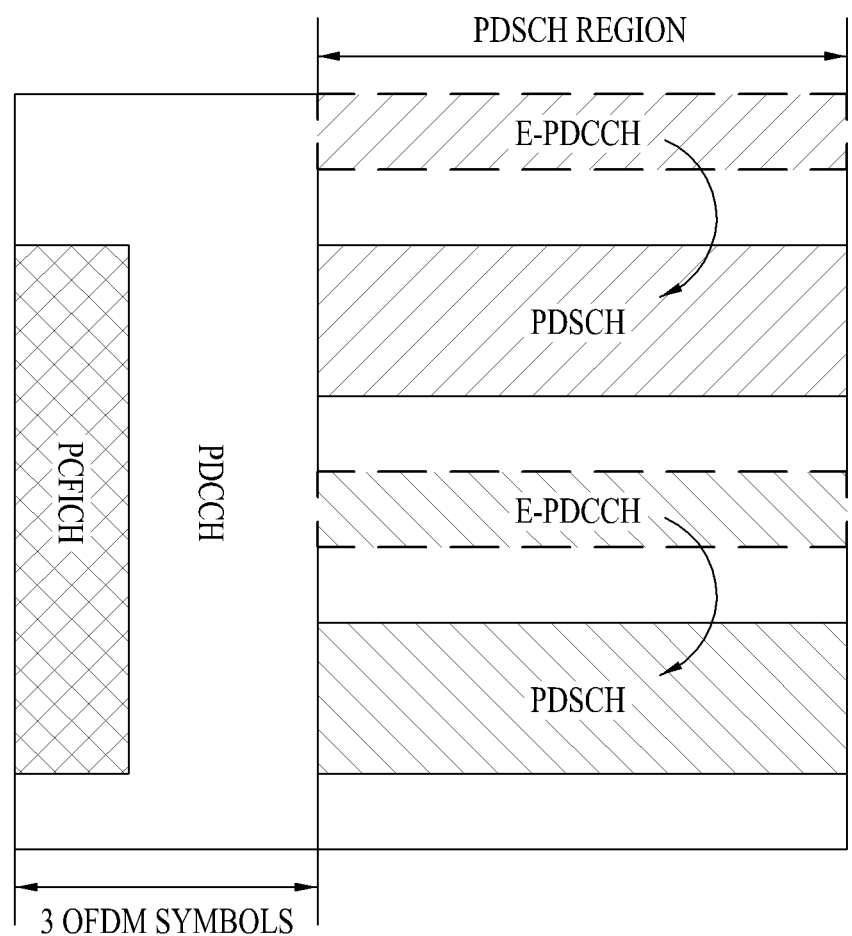
FIG. 6 is a view illustrating an enhanced PDCCH and a PDSCH scheduled by the EPDCCH.

FIG. 6 is a view illustrating an EPDCCH and a PDSCH scheduled by the EPDCCH.

Referring to FIG. 6, in general, an EPDCCH can be used by defining a portion of a PDSCH region for transmitting data and a UE can perform a blind decoding procedure for detecting whether an EPDCCH of the UE is present. The EPDCCH is disadvantageous in that, as the number of UEs that perform the same scheduling operation (i.e., PDSCH and PUSCH control) as a legacy PDCCH but access a node such as an RRH increases, a higher number of EPDCCHs are allocated into a PDSCH region to increase the number of times of blind decoding to be performed by the UEs, thereby increasing the complexity of the corresponding procedure.

There is also a need to consider a method for multiplexing an EPDCCH for a plurality of UEs. In detail, there has been a proposal for a scheme for multiplexing an EPDCCH for a plurality of UEs by cross interleaving the EPDCCH in the frequency domain or the time domain when a common resource region, i.e., a common PRB set is set.

Figure 7:
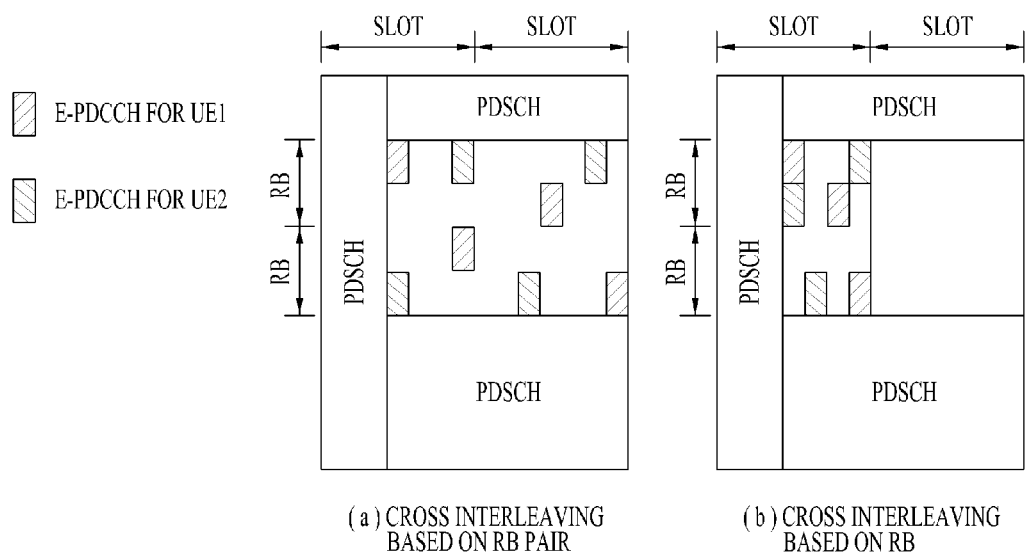
FIG. 7 is a view illustrating a method for multiplexing an EPDCCH for a plurality of UEs.

FIG. 7 is a view illustrating a method for multiplexing an EPDCCH for a plurality of UEs.

In particular, FIG. 7(a) illustrates an example in which a common PRB set is configured on a PRB pair basis and cross interleaving is performed based on the PRB pair. On the other hand, FIG. 7(b) illustrates an example in which a common PRB set is configured on a PRB basis and cross interleaving is performed based on the PRB. This method is advantageous in that diversity gain can be acquired in terms of frequency/time domain across a plurality of RBs.

Throughout this specification, the present invention proposes a method for setting an eCCE via RE indexing when the eCCE includes a fixed number of REs, a method for setting an eCCE via PRB RE partitioning when 1PRB includes a fixed number of eCCEs, and a method for setting an eCCE in consideration of CSI-RS transmission together. Although the proposed methods will be described in detail in terms of an extended CP, the proposed methods are not limited to the extended CP and can also be applied to a standard CP unless clearly specified otherwise in context.

Figure 8:
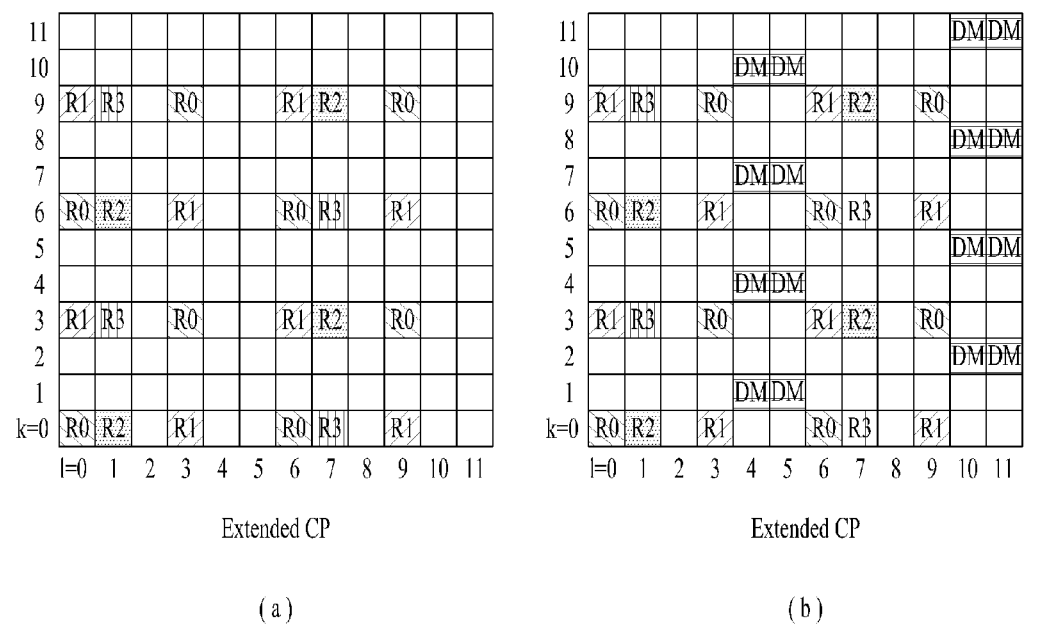

FIG. 8 illustrates an RS pattern for an extended CP. FIG. 8(a) illustrates a CRS pattern of an LTE Release 8 for an extended CP. CRSs are present for antenna ports 0, 1, 2, and 3, respectively. In particular, the number of REs allocated to antenna ports 0 and 1 and the number of REs allocated to antenna ports 2 and 3 are different.

FIG. 8(b) illustrates the case in which a DM-RS of LTE Release 9 or a DM-RS of LTE Release 10 is added to an extended CP. In addition, although FIG. 8(b) illustrates the case in which OFDM symbols corresponding to l=0, 1, and 2 cannot be used as an EPDCCH, the number of the OFDM symbols that cannot be used as an EPDCCH can vary.

1. Example in which eCCE Includes a Fixed Number of REs

An eCCE is assumed to include n REs. n may be a fixed number and may have 1 to a value (nPRB RE) corresponding to the number of available REs in one PRB pair. That is, each eCCE includes the same number of REs. Here, the number (nPRB RE) of the available REs in one PRB pair refers to an RE that can be used as an E-PDCCH. Here, REs allocated to a control region (a legacy PDCCH) such as a CRS or a DM-RS are excluded.

When an eCCE includes n REs, a method for setting an eCCE will now be described.

Figure 9:
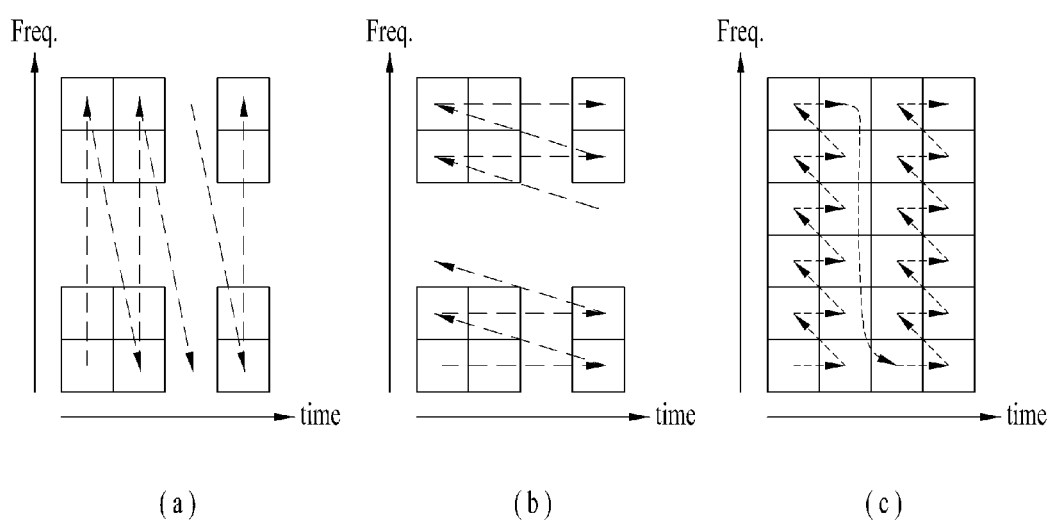
FIG. 9 illustrates an RE indexing method in an EPDCCH.

For the available REs in one PRB pair, an index 1 to n is applied, i.e., is indexed. In this case, the index may be applied using a frequency-first method, a time-first method, or a hybrid method, which is illustrated in FIG. 9. The frequency-first method and the time-first method are each a method for indexing in ascending order or descending order according to indexes (k and l) of a symbol and a subcarrier. The hybrid method is a modified method of the frequency-first method and the time-first method, in which S symbols are bonded and indexing is performed using the frequency-first method and the time-first method in the bonding unit.

An index is not applied to the remaining 0 to (n−1) REs that are obtained after the aforementioned indexes are applied. The corresponding RE cannot configure an eCCE and thus is not used to transmit an E-PDCCH.

Figure 10:
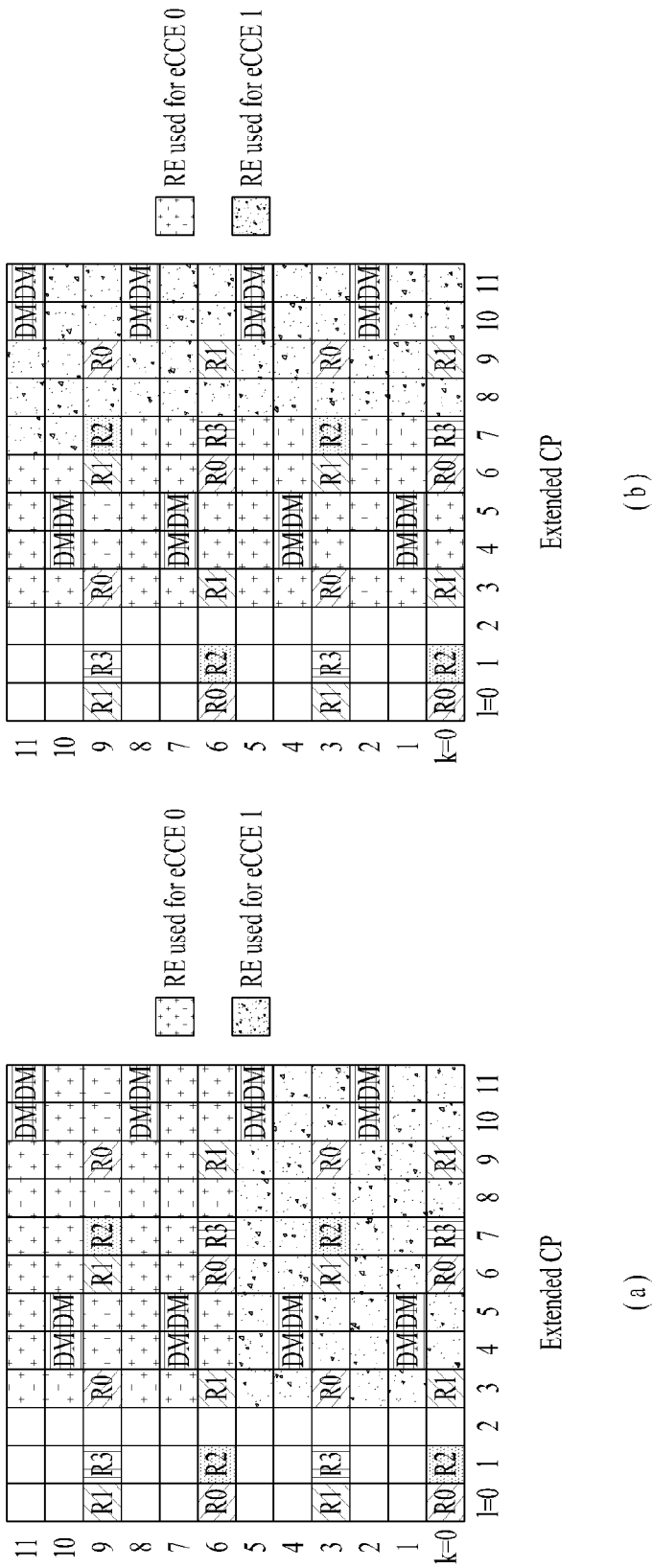
FIG. 10 illustrates an RE indexing method in an EPDDCH.

FIG. 10 illustrates an example in which an REG indexing is performed when it is assumed that each eCCE includes 38 REs in an extended CP, that is, 2 eCCEs are present. FIG. 10(a) is a result obtained via indexing using the time-first method. FIG. 10(b) is a result obtained via indexing using the frequency-first method.

Figure 11:
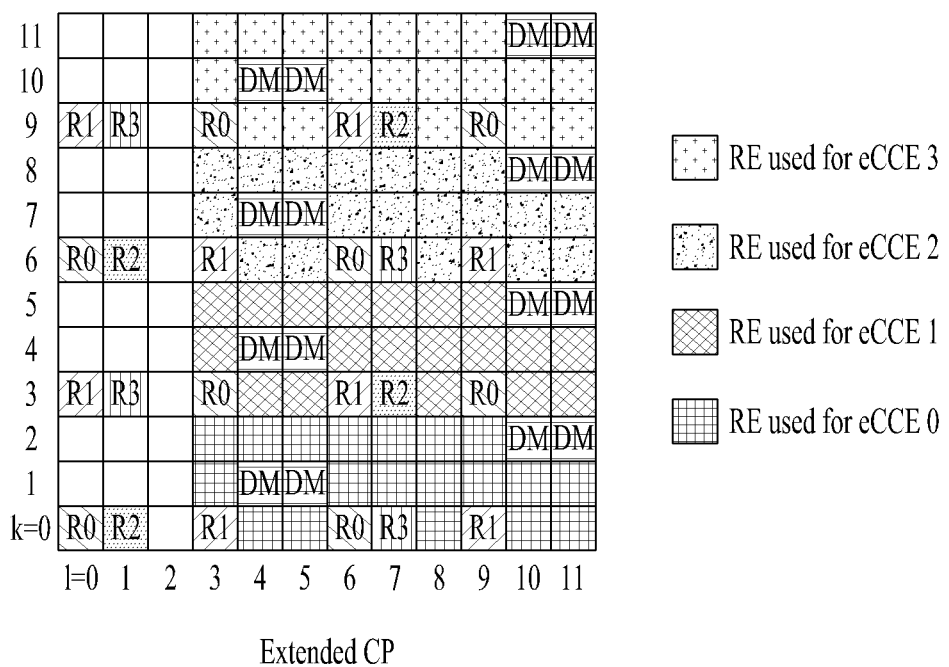
FIG. 11 illustrates an RE indexing method in an EPDDCH.

FIG. 11 illustrates an example in which indexing is performed when an eCCE includes 19 REs in an extended CP. Although only a result of indexing of the time-first method is illustrated, the frequency-first method or the hybrid method can be applied.

The number of REs included in an eCCE, n may be preferably configured in such a manner as to minimize the number of REs that are not used while maintaining the number of appropriate eCCEs per 1 PRB. However, frequently, the number of REs that are not inevitably used cannot be reduced. An example of this case may be a case in which a value n has a specific constraint condition, and for example, an eCCE is a set of units including a specific number of REs. In other words, an eCCE has a unit including q REs and thus the number of REs included in the eCCE needs to be configured to be a multiple of q. When the number of REs included in an eCCE is n, an equation 'n mod q=0' needs to be satisfied. Even if n needs to be determined to be a multiple of q, the remaining 0 to (n−1) REs that are obtained after an RE is indexed using the time-first method, the frequency-first method, or the hybrid method are not used, as described above. However, in this method, since n needs to be set to be a small value compared with the number of available REs, a plurality of REs is not frequently used for E-PDCCH transmission and thus a problem may arise in that power is unequally transmitted only to a specific symbol or subcarrier.

Figure 12:
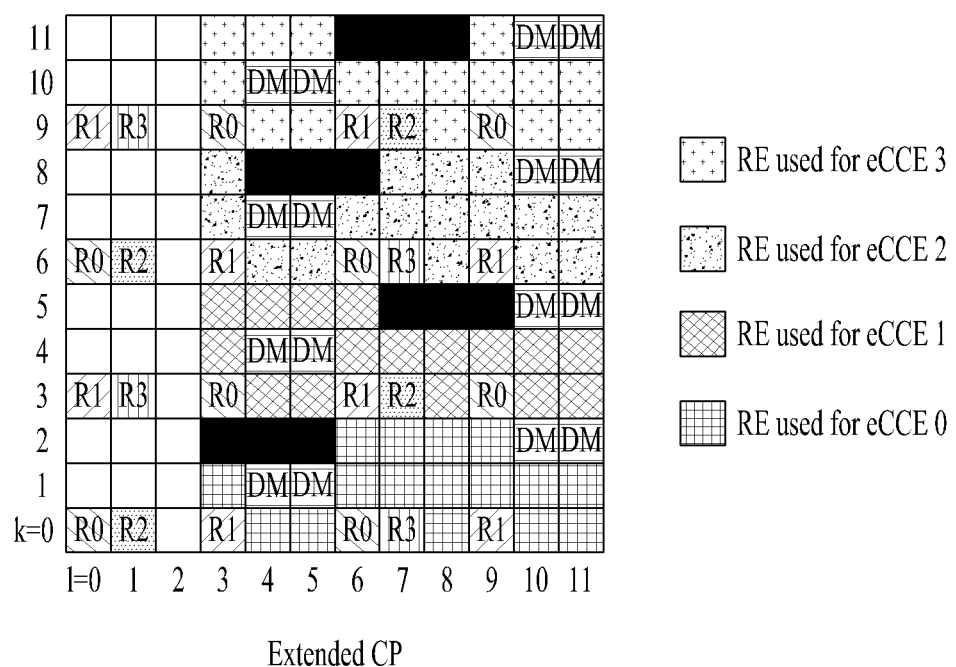
FIG. 12 illustrates an RE indexing method in an EPDDCH.

In order to overcome this problem, the remaining (n−1) REs are distributed equally as possible rather than concentrating on a specific symbol or time period. In this case, appropriate time-frequency offset for each eCCE may be applied. For example, x for minimizing $n^{PRB}_{RE}$ mod x is set to be the number of REs included in 1 eCCE, indexing is performed, the number of the remaining REs obtained after n is actually indexed is distributed according to floor($n^{PRB}_{RE}/x$), and REs may be excluded by as much as the number of REs distributed in each eCCE. The case of q=4 and n=16 is illustrated in FIG. 12. FIG. 12 illustrates the case in which the remaining REs are distributed in the time domain. However, alternatively, when a frequency-first indexing method is used, the remaining REs can be similarly distributed in the frequency domain.

2. Example in which 1 PRB Pair Includes n eCCEs

The case in which a PRB includes n eCCEs refers to the case in which the eCCEs include different numbers of REs. In this case, a simplest method for setting n eCCEs is a method for partitioning a valid time or frequency domain of 1 PRB pair into n pieces. Both time and frequency domains may be partitioned using the hybrid method. In this case, even if subcarriers or symbols are equally partitioned for each respective eCCE, eCCEs may include different numbers of REs due to an RS or a legacy PDCCH. That is, as the number of available REs of 1 PRB varies, the number of REs included in each eCCE may also vary.

On the other hand, when eCCEs include different number of REs, the number of REs allocated to an eCCE may be increased based on 1 PRB pair. For example, like in the aforementioned example, when an eCCE has a constraint condition of having a unit including q REs, influence of the constraint condition on eCCE partitioning is reduced. When the number ($n^{PRB}_{RE}$) of available REs of 1 PRB pair is 19*4 REs, if partition is performed to achieve four eCCE with 4 RE units, the number (# of RE/eCCE) of REs per eCCE is 16 and thus the number of remaining REs is 12, in the aforementioned example. However, in this example, three eCCEs of 4 of total eCCEs include 20 REs and the remaining eCCE includes 16 REs, and thus, there is no remaining RE.

3. Example in which CSI-RS is Considered

Figure 13:
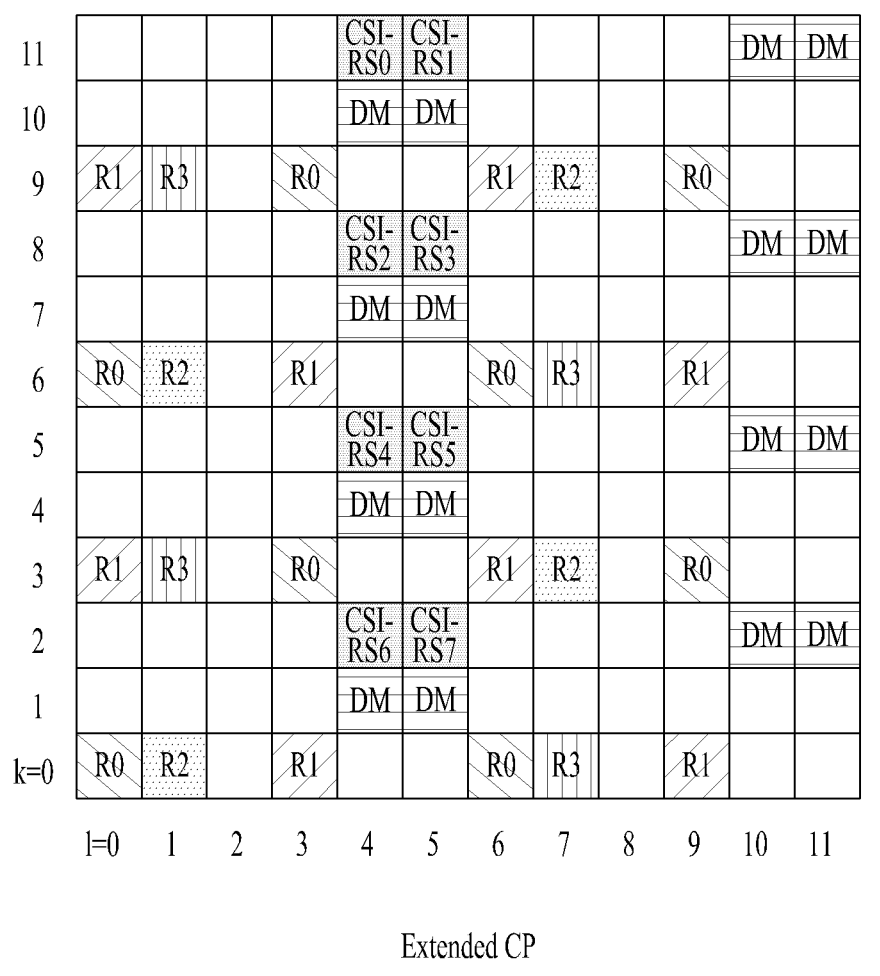

FIG. 13 is a view illustrating the case in which CSI-RS patterns are added to an extended CP. CSI-RS0 and CSI-RS1 are used for port 2 and CSI-RS0 to CSI-RS3 are used for port 4.

In the above proposed eCCE partitioning or resource allocation method for an E-PDCCH, only a legacy PDCCH, CRS, and DM-RS are considered. However, when a CSI-RS is present, an RE used for CSI-RS transmission cannot also be used for E-PDCCH transmission, and thus, the number of REs included in an eCCE as a basic unit of E-PDCCH transmission may vary. In this case, when a CSI-RS is configured by REs that belong to one eCCE, the corresponding eCCE includes a smaller number of REs than other eCCEs by as much as the number of REs used for the CSI-RS, and thus, a problem arises in terms of imbalance between the numbers of REs of eCCEs. Accordingly, in order to equally maintain the number of REs included in an eCCE, a CSI-RS needs to be transmitted using a method of equally using REs that belong to various eCCEs as possible. This means that REs used for a CSI-RS need to be indexed to different eCCEs as possible in terms of eCCE partitioning. In addition, it is deemed that a new method for CSI-RS transmission needs to be considered differently from a legacy CSI-RS configuration. However, the scope of an embodiment of the present invention is limited only to an RB of an E-PDCCH and a conventional CSI-RS configuration method is applied to the other RBs.

Figure 14:
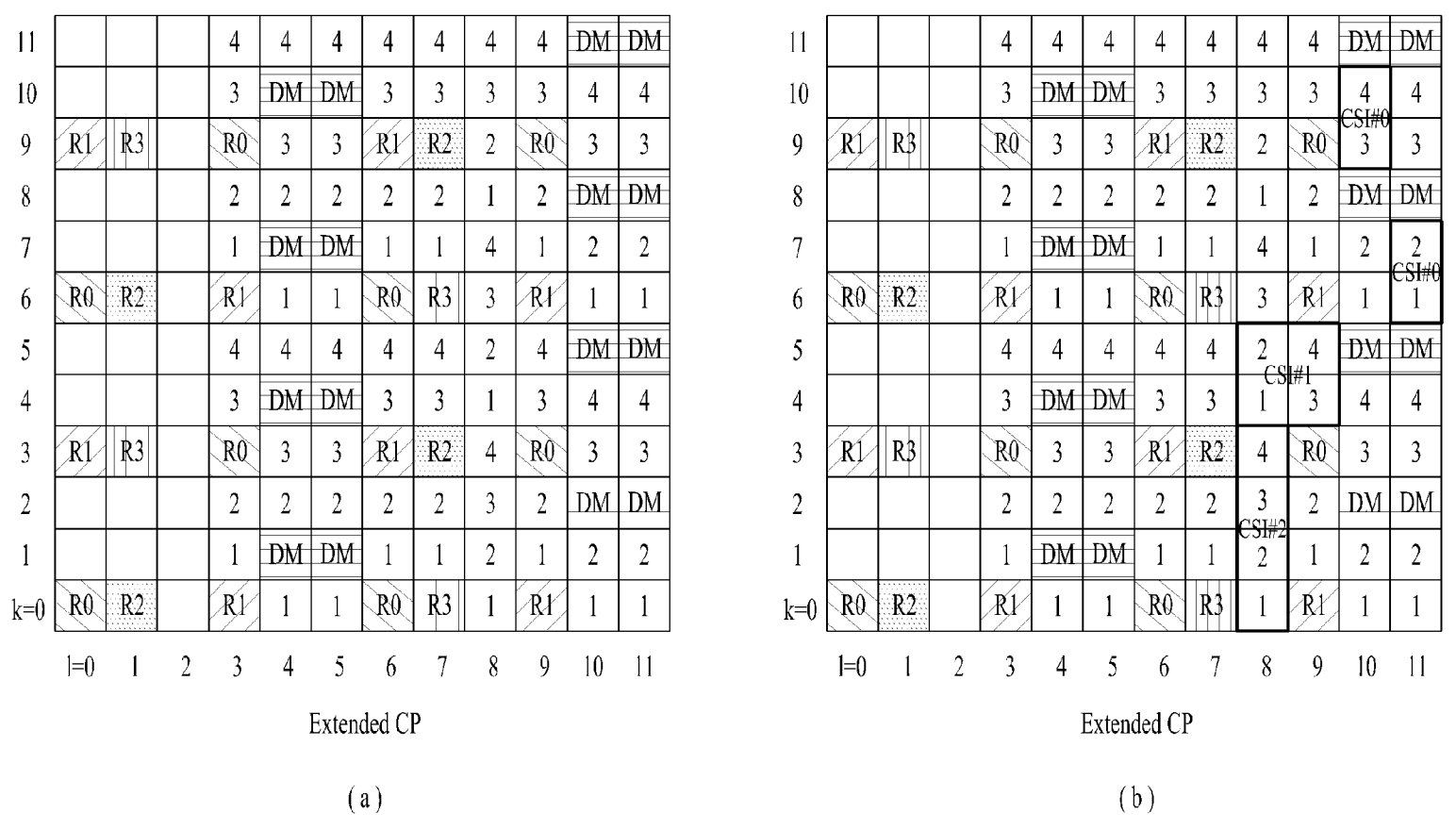

An eNB may configure a CSI-RS so as to maintain the same number of REs allocated or mapped to each eCCE. That is, the eNB needs to appropriately configure the CSI-RS so as to maintain the number of REs allocated to each eCCE. In other words, the eNB determines an RE (or a location of the RE) for a CSI-RS so as to equally distribute REs used for CSI-RSs to each eCCE. For example, REs to be included in each eCCE may be allocated to a CSI-RS while being selected one RE by one RE via a round-robin scheme. FIG. 14(*a*) illustrates an example in which 1 PRB pair is partitioned into four eCCEs via frequency-first indexing. FIG. 14(*b*) illustrates an example in which an eNB configures a 4-port CSI-RS in the eCCE configuration of FIG. 14(*a*). Since four REs need to be selected from four eCCEs, one RE is selected from each eCCE and allocated for CSI-RS transmission. Although various random combinations can be used as a method for selecting an RE, CSI#0, CSI#1, and CSI#2 are illustrated as three available examples.

A method for allocating an RE for each eCCE will now be described according to an embodiment of the present invention. The method for allocating REs included in 1 PRB pair to each eCCE may be extensively classified into a rate matching method and a puncturing method. First, the rate matching method will be described.

Figure 15:
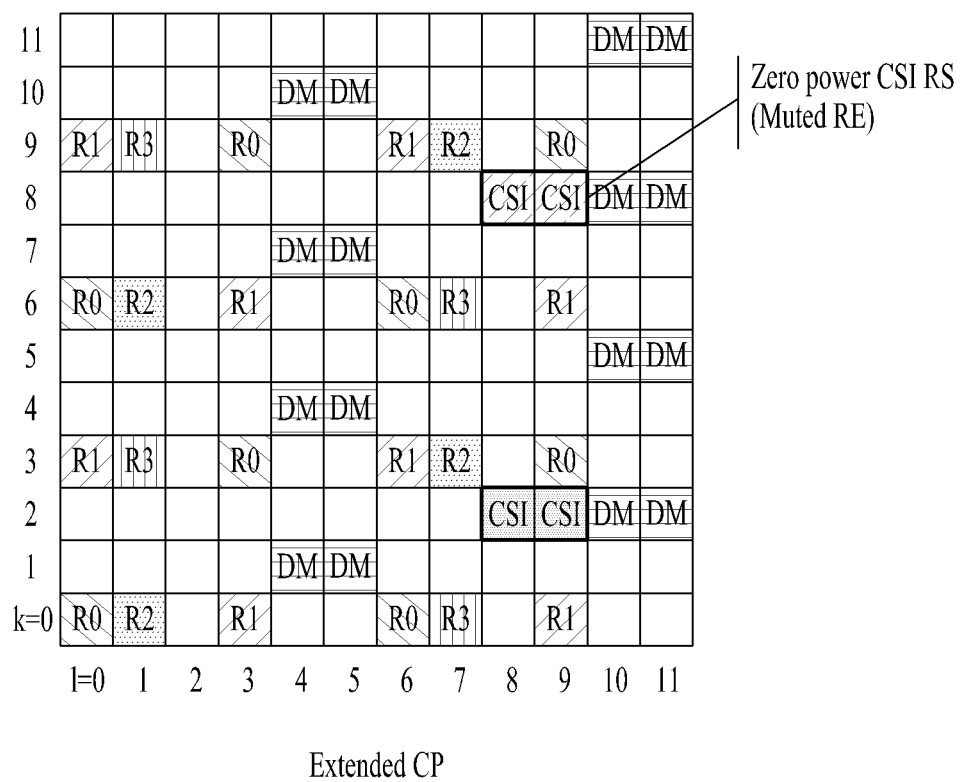
FIG. 15 illustrates an example of RE allocation for a zero-power CSI-RS in an EPDDCH.

When each eCCE includes the same number of REs, if the number of REs used for CSI-RS transmission is not maintained to a multiple of the number of eCCEs, a problem in terms of imbalanced number of REs for each eCCE is still present. Accordingly, in order to overcome this problem, a zero-power CSI-RS is used to equally maintain the number of REs for each eCCE. An eNB may appropriately set a zero-power or muted CSI-RS according to the number of eCCEs included in 1PRB pair. Accordingly, during CSI-RS configuration, the eNB further sets the zero-power CSI-RS or configures a CSI-RS that uses more antenna ports, determines a specific antenna port to zero-power, and then adjusts the number of REs used for E-PDCCH transmission for each eCCE so as to maintain the number of the REs. The eNB does not use an RE including a zero-power CSI-RS for E-PDCCH transmission and applies rate matching to a reception UE so as to enable to decode an E-PDCCH. FIG. 15 illustrates an example in which, when 1PRB pair is partitioned into 4 eCCEs, if a 2-port CSI-RS is used for CSI-RS transmission, a 2-port zero-power CSI-RS is further configured to maintain the number of REs for each eCCE. A location of zero-power CSI-RS may be randomly determined.

Hereinafter, a method for indicating a zero-power CSI-RS configuration when the zero-power CSI-RS configuration is used to allocate the same number of REs are allocated to each eCCE will be described.

3.1 First Example

An eNB notifies a UE of a non zero-power CSI-RS configuration and a zero-power CSI-RS configuration via higher layer signaling, for example, RRC signaling, etc. In this case, the zero-power CSI-RS may be configured at an independent location from the non zero-power CSI RS configuration and accordingly configured in consideration of a channel environment, an inter-cell operation, or the like.

3.2 Second Example

When an eNB configures a non zero-power CSI-RS in all E-PDCCH RBs, a reception UE can assume that a zero-power CSI-RS configuration pair corresponding to the non zero-power CSI-RS is present at a predetermined location. According to this method, a zero-power CSI-RS is paired with a predetermined RE location for a random CSI-RS configuration, thereby reducing unnecessary signaling overhead between an eNB and a UE. Although random various methods may be used as a method for determining a location of a zero-power CSI-RS paired with a CSI-RS, a method of using another OFDM symbol of the same subcarrier as a CSI-RS, a method of using another OFDM symbol of a different subcarrier from the CSI-RS, etc. may be used. In this case, an interval between subcarriers or OFDM symbols of the non zero-power CSI-RS and the CSI-RS.

Figure 16:
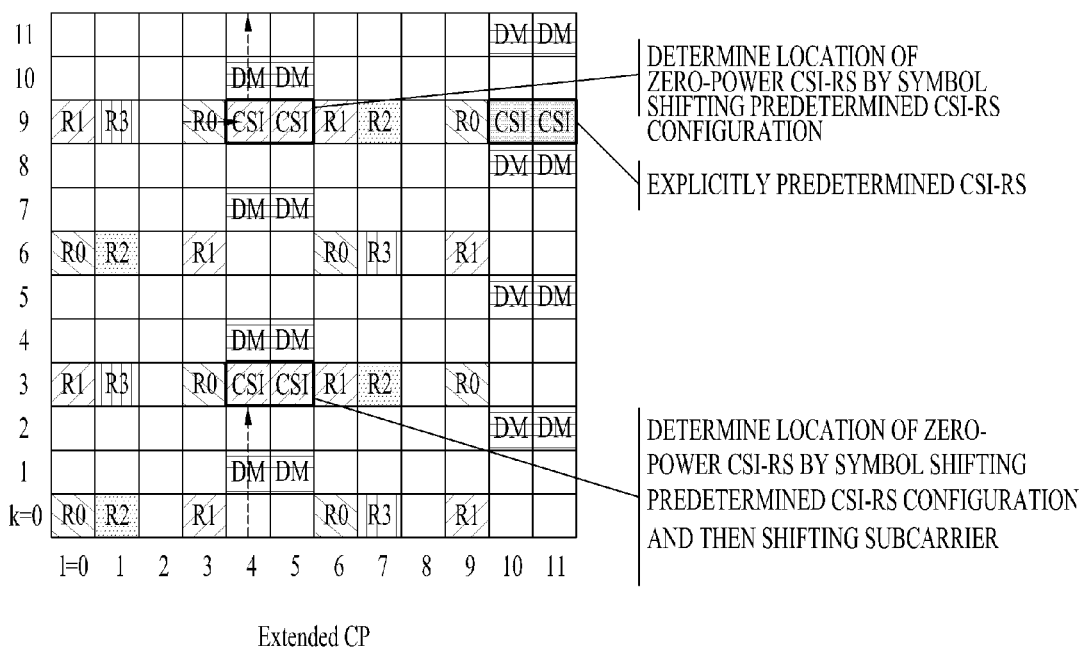
FIG. 16 illustrates an example of RE allocation for a zero-power CSI-RS in an EPDDCH.

When the interval is specified, a location of an RE may be determined as follows. First, REs used for a CSI-RS is cyclic shifted in an OFDM symbol-direction by as much as ½ the number of OFDM symbols that can be used for an E-PDCCH (or E-PDCCH transmission) on the same subcarrier (that is, upon exceeding a last symbol of a PRB pair, the REs are returned to a first OFDM symbol and shifted by as much as the number of the remaining OFDM symbols), and then, a location of an RE that is shifted in a subcarrier direction by as much as ½ the number of subcarriers that can be used in an E-PDCCH at the shifted location can be determined as a location of a zero-power CSI-RS. Needless to say, in this case, a CRS, a DM-RS, or a non zero-power CSI-RS cannot be the shifted location. FIG. 16 illustrates a location of a zero-power CSI-RS for a 2-port CSI-RS configured at a random location. When 1 PRB pair includes two eCCEs, a UE may assume that a zero-power CSI-RS is not configured, and when 1 PRB pair includes four eCCEs, the UE may assume that a 2-port zero-power CSI-RS is further configured at a location illustrated in FIG. 16.

3. Third Example

Figure 17:
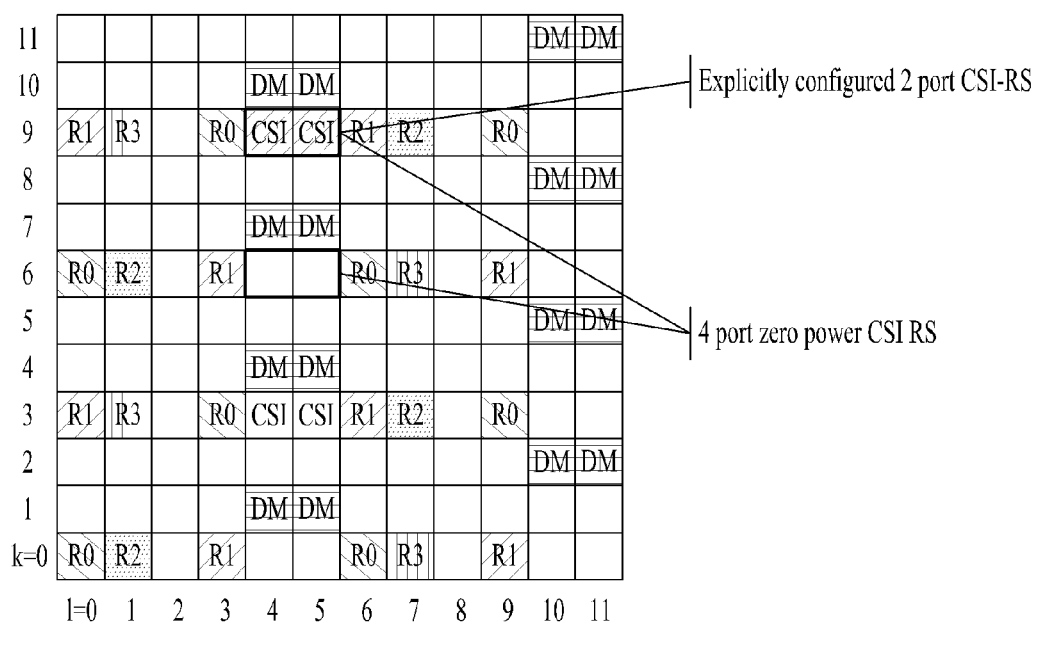
FIG. 17 illustrates an example of RE allocation for a zero-power CSI-RS in an EPDDCH.

As another method, it may be assumed that a zero-power CSI-RS including a configured RE in which a non zero-power CSI-RS is configured may be configured together in all E-PDCCH RBs. This method is also a method for determining whether a zero-power CSI-RS is determined and a location of the configured zero-power CSI-RS according to a predetermined rule between an eNB and a UE. For example, when the number of antenna ports of the configured non zero-power CSI-RS is greater than the number of eCCEs in 1PRB, it may be assumed that a zero-power CSI-RS corresponding to the number of antenna ports corresponding to the number of eCCEs is simultaneously configured. Accordingly, 1 PRB pair includes four eCCEs. In this regard, when a 2-port CSI-RS is transmitted, the eNB and the UE may assume that a 4-port zero-power CSI-RS including an RE in which a 2-port non zero-power CSI-RS is configured is present. That is, REs to which the zero-power CSI-RS is mapped may be determined as some or all REs obtained by excluding REs in which the non-zero power CSI-RS is configured, from REs for a specific CSI-RS configuration (refer to Tables 3 and 4) including REs in which the non-zero power CSI-RS is configured. FIG. 17 illustrates this example.

A puncturing method as a method for allocating REs included in 1PRB pair to each eCCE will now be described.

Figure 18:
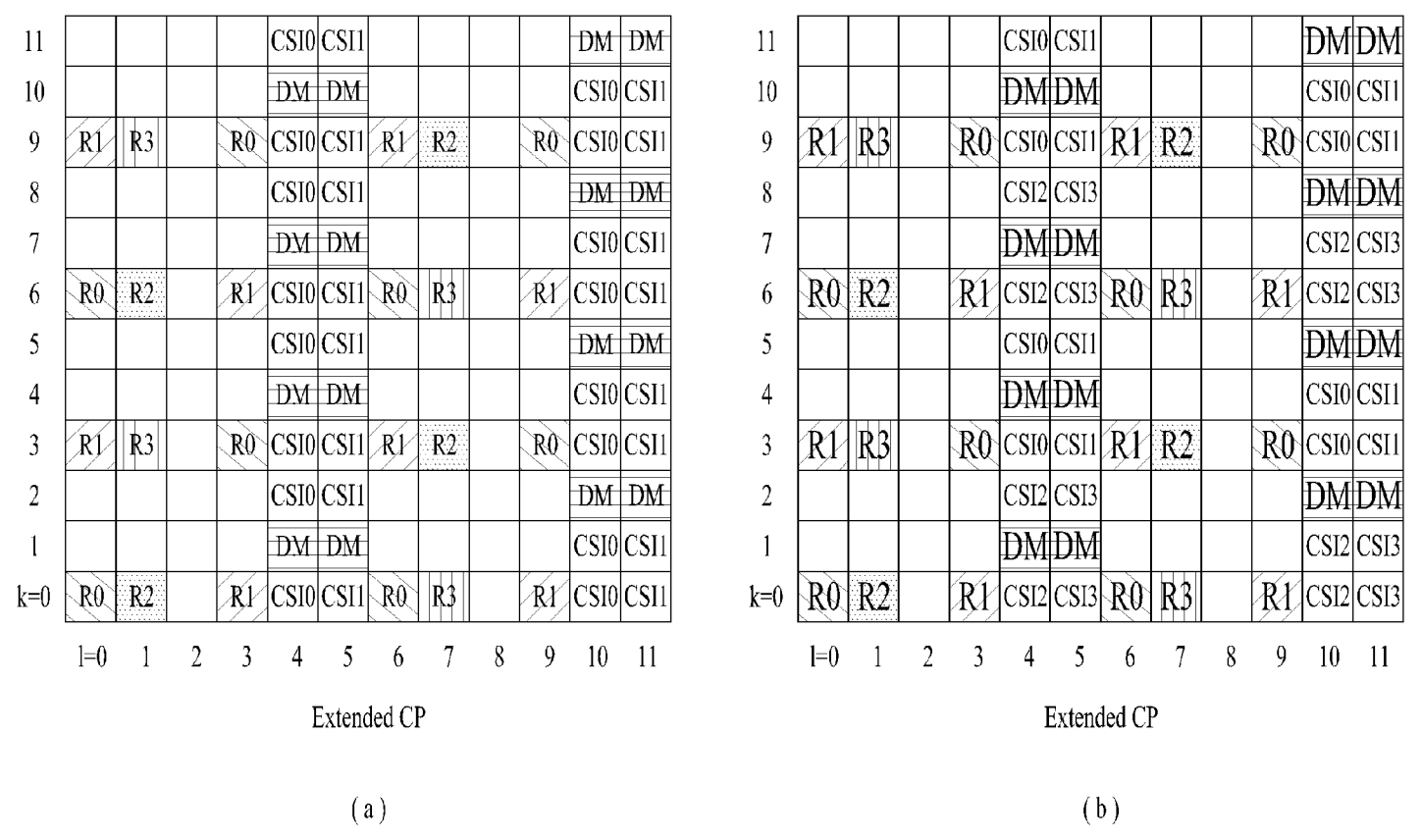

A location of an RE used for CSI-RS transmission may have a limited combination in 1 PRB pair. FIG. 18 illustrates an available reuse pattern of 2-port and 4-port CSI-RSs. Accordingly, an eCCE is partitioned in consideration of a location of an available CSI-RS RE. When this method is used, it is easy to set a CSI-RS such that REs used for CSI-RS transmission is punctured from different eCCEs.

Figure 19:
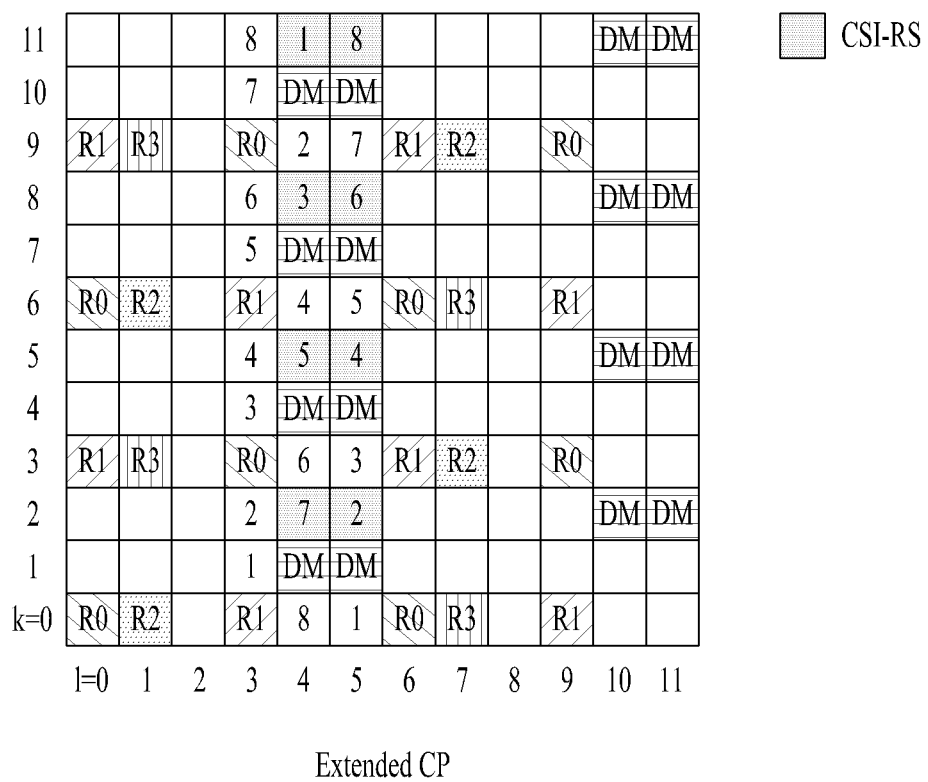
FIG. 19 illustrates an RE indexing method in an EPDDCH.

FIG. 19 illustrates an example of a method for allocating REs in 1PRB pair to each eCCE when the 1PRB pair includes 8 eCCEs. REs included in the same eCCE are denoted by the same number (index) and REs are allocated to different eCCEs using a frequency-first method. Although FIG. 19 illustrates the case in which indexing is performed only on i=3 to 5 for simplification, indexing is performed on the remaining i using the same method. For different indexes as possible in all patterns for 2, 4, and 8-ports, indexing may be performed on k (i.e., frequency domain) in ascending order for the case of i=odd number and perform on k in descending order for the case of i=even number.

In order to maintain a number difference between REs for each eCCE irrespective of presence of a CSI-RS, REs used for CSI-RS transmission need to be equally allocated to each eCCE. Accordingly, when 1PRB pair includes two eCCEs, it is not difficult to equally maintain the number of REs for each eCCE. In this regard, the number of REs used for a CSI-RS is an even number. Accordingly, an eCCE needs to be configured in such a manner that, when two REs are used for a CSI-RS (2-port CSI-RS), one RE is used for the CSI-RS for each eCCE and when four REs are used for a CSI-RS (4-port CSI-RS), two REs are used for the CSI-RS for each eCCE.

Figure 20:
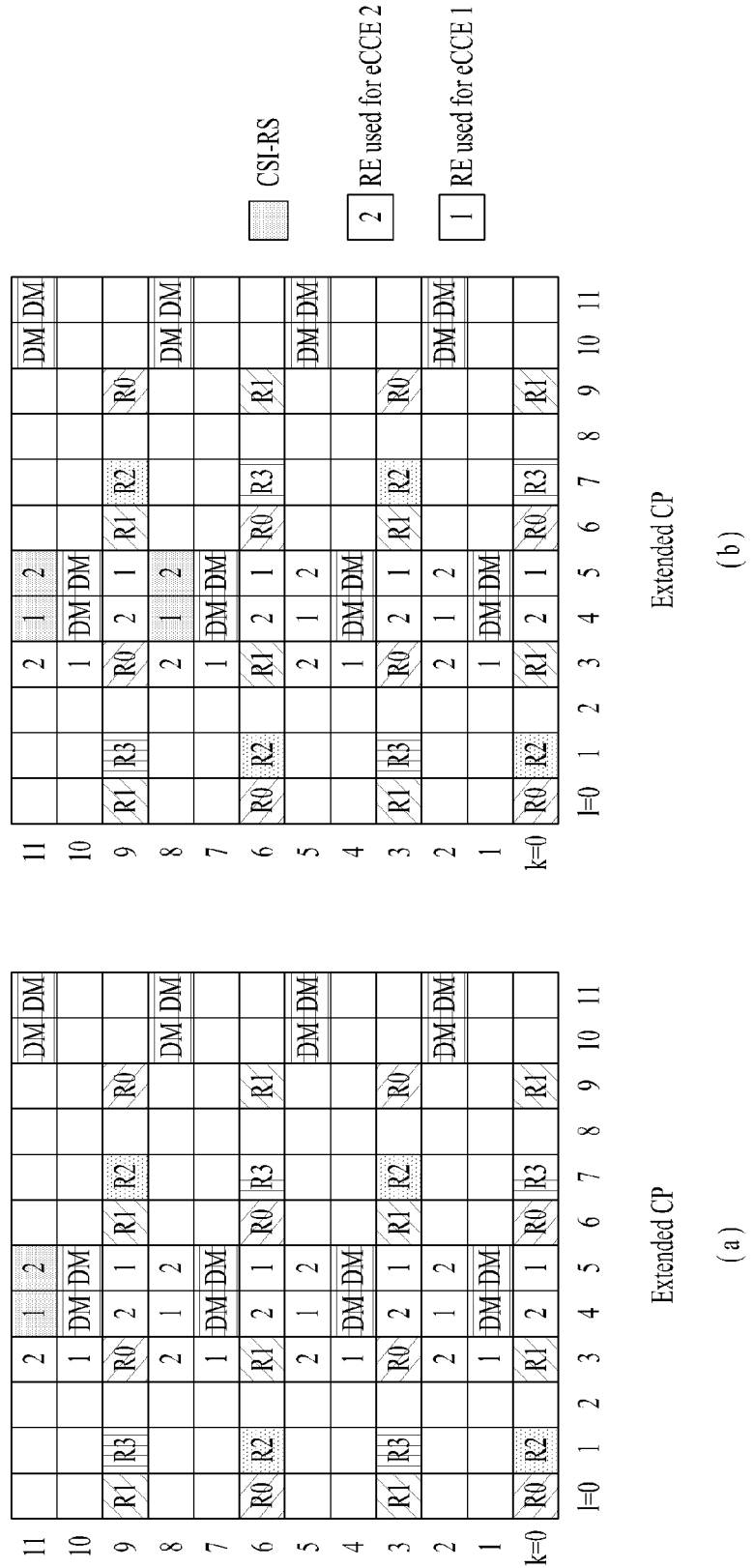
FIG. 20 illustrates an RE indexing method in an EPDDCH.

FIG. 20 illustrates a location of a CSI-RS when a 2-port CSI-RS and a 4-port CSI-RS are transmitted and 1PRB pair includes two eCCEs. In this case, in FIG. 20(a), each eCCE includes the same number of REs, that is, 38−1=37 REs, and in FIG. 20(b), each eCCE includes the same number of REs, that is, 38−2=36 REs.

Figure 21:
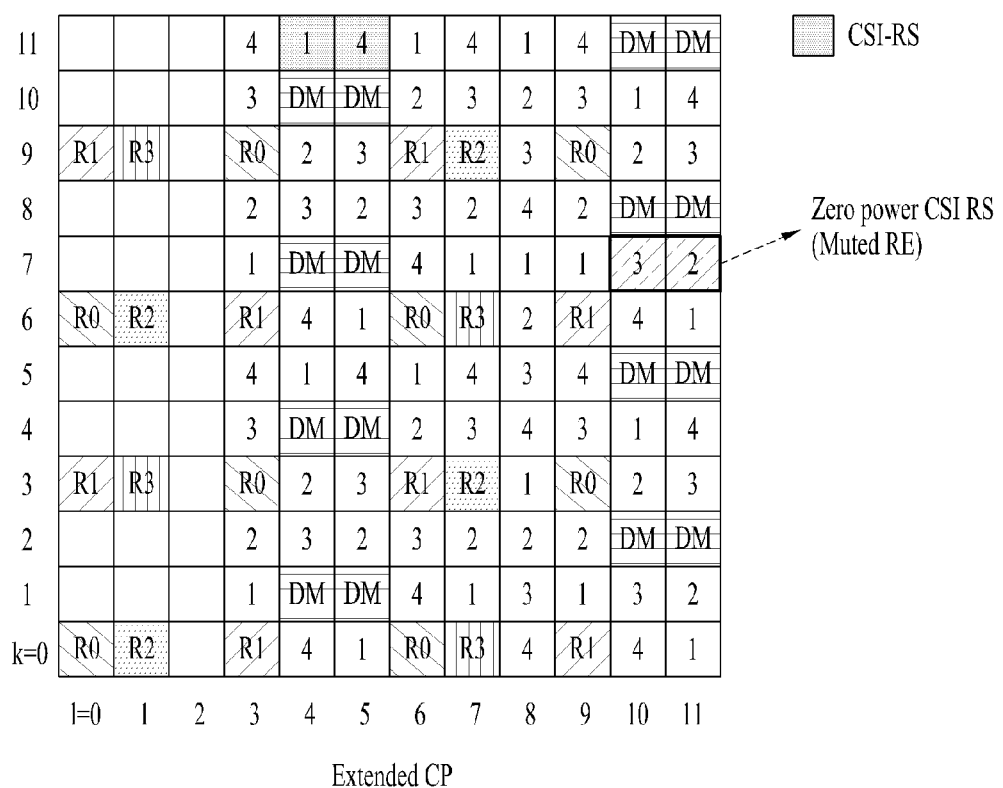
FIG. 21 illustrates an RE indexing method in an EPDDCH.

When the number of REs used for CSI-RS transmission is less than the number of eCCEs, REs used for CSI-RS transmission cannot be equally allocated for each eCCE. For example, when 1 PRB pair includes four eCCEs, in the case of a 4-port CSI-RS, REs can be distributed to be used for a CSI-RS one RE by one RE in each eCCE, but in the case of a 2-port CSI-RS, the same number of REs cannot be distributed to be used for a CSI-RS in each eCCE. That is, one RE in only two eCCEs is used for CSI-RS transmission and an RE of the remaining two eCCEs is not used for CSI-RS transmission. Needless to say, an RE of only one eCCE may be allocated for CSI-RS transmission. Accordingly, in this case, puncturing is performed on the assumption of 2-port zero-power CSI-RS transmission using an RE of the remaining two eCCEs. That is, puncturing is also performed on the assumption of zero-power CSI-RS transmission with respect to an RE that is not used for CSI-RS transmission in order to maintain the number of REs for each eCCE. FIG. 21 illustrates an example.

Figure 22:
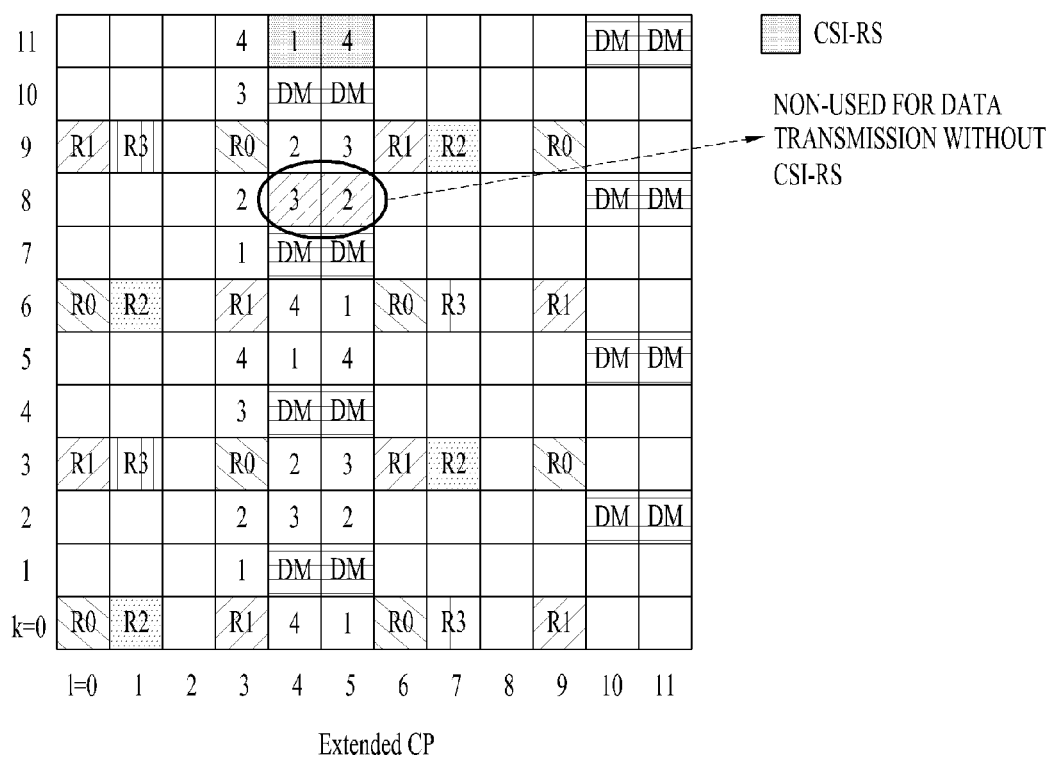
FIG. 22 illustrates an RE indexing method in an EPDDCH.

As another method, puncturing may be performed on the assumption of a CSI-RS having more antenna ports. In FIG. 22, when 1PRB pair includes four eCCEs, even if a 2-port CSI-RS is transmitted, REs in which a 4-port CSI-RS is transmitted are not used for E-PDCCH transmission such that one RE from each of the four eCCEs is used for a CSI-RS.

Figure 23:
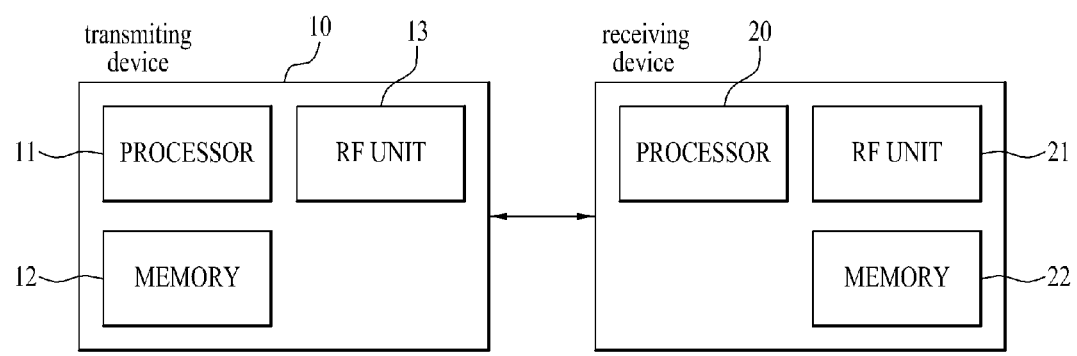
FIG. 23 is a block diagram of components of transmitting and receiving devices which execute the present invention.

FIG. 23 is a block diagram of a transmitting device 10 and a receiving device 20 configured to implement exemplary embodiments of the present invention.

Referring to FIG. 23, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 in downlink. In embodiments of the present invention, an eNB serves as the receiving device 20 on uplink and as the transmission device 10 in downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention is applicable to a wireless communication device such as a user equipment (UE), base station (BS), or other devices.

The invention claimed is:

1. A method for receiving downlink signals in a wireless communication system, the method comprising:
receiving downlink signal from a base station and detecting the downlink signal,
wherein the detecting the downlink signal includes, if the number of resource elements (REs) to which channel state information-reference signal (CSI-RS) in a downlink subframe is mapped is smaller than the number of the enhanced control channel elements (eCCEs) for an enhanced physical downlink control channel (EPDCCH) in the downlink subframe, assuming REs, the number of which corresponds to a difference value between the number of eCCEs and the number of REs, which are included in the EPDCCH, as a zero-power CSI-RS, and
wherein the REs assumed as the zero-power CSI-RS is included in an eCCE that does not comprise the REs to which the CSI-RS is mapped.

2. The method according to claim 1, wherein the REs to which the CSI-RS is mapped and the REs assumed as the zero-power CSI-RS are equally allocated to all eCCEs.

3. The method according to claim 1, wherein the REs assumed as the zero-power CSI-RS is mapped to a location obtained by cyclic shifting a location of the REs to which the CSI-RS is mapped by as much as a predetermined distance in a time-frequency direction.

4. The method according to claim 1, wherein the REs assumed as the zero-power CSI-RS is mapped to remaining REs obtained by excluding the REs to which the CSI-RS is mapped, from REs for a specific CSI-RS configuration comprising the REs to which the CSI-RS is mapped.

5. The method according to claim 1, wherein information about a location of the REs assumed as the zero-power CSI-RS is received via higher layer signaling.

6. A method for transmitting downlink signals in a wireless communication system, the method comprising:
transmitting downlink signal to a user equipment (UE),
wherein the transmitting the downlink signal includes: if the number of resource elements (REs) to which channel state information-reference signal (CSI-RS) in a downlink subframe is mapped is smaller than the number of the enhanced control channel elements (eCCEs) for an enhanced physical downlink control channel (EPDCCH) in the downlink subframe, configuring REs, the number of which corresponds to a difference value between the number of eCCEs and the number of REs included in the EPDCCH, as a zero-power CSI-RS, and
wherein the REs configured as the zero-power CSI-RS are included in an eCCE that does not comprise the REs to which the CSI-RS is mapped.

7. A user equipment (UE) configured to receive downlink signals in a wireless communication system, the UE comprising:
a radio frequency (RF) unit; and
a processor configured to control the RF unit,
wherein the processor is configured to receive downlink signal from a base station and detects the downlink signal, and
the processor is configured to: if the number of resource elements (REs) to which channel state information-reference signal (CSI-RS) in a downlink subframe is mapped is smaller than the number of the enhanced control channel elements (eCCEs) for an enhanced physical downlink control channel (EPDCCH) in the downlink subframe, assume REs, the number of which corresponds to a difference value between the number of eCCEs and the number of REs, which are included in the EPDCCH, as a zero-power CSI-RS; and
wherein the REs assumed as the zero-power CSI-RS is included in an eCCE that does not comprise the REs to which the CSI-RS is mapped.

8. The UE according to claim 7, wherein the REs assumed as the zero-power CSI-RS is equally allocated to all eCCEs.

9. The UE according to claim 7, wherein the REs assumed as the zero-power CSI-RS is mapped to a location obtained by cyclic shifting a location of the REs to which the CSI-RS is mapped by as much as a predetermined distance in a time-frequency direction.

10. The UE according to claim 7, wherein the REs assumed as the zero-power CSI-RS is mapped to remaining REs obtained by excluding the REs to which the CSI-RS is mapped, from REs for a specific CSI-RS configuration comprising the REs to which the CSI-RS is mapped.

11. The UE according to claim 7, wherein information about a location of the REs assumed as the zero-power CSI-RS is received via higher layer signaling.

12. A base station configured to transmit downlink signals in a wireless communication system, the base station comprising:
a radio frequency (RF) unit; and
a processor configured to control the RF unit,
wherein the processor is configured to transmit downlink signal to a user equipment (UE), and
the processor is configured to: if the number of resource elements (REs) to which channel state information-reference signal (CSI-RS) in a downlink subframe is mapped is smaller than the number of the enhanced control channel elements (eCCEs) for an enhanced physical downlink control channel (EPDCCH) in the downlink subframe, configure REs, the number of which corresponds to a difference value between the number of eCCEs and the number of REs included in the EPDCCH as a zero-power CSI-RS; and
wherein the REs configured as the zero-power CSI-RS is included in an eCCE that does not comprise the REs to which the CSI-RS is mapped.

* * * * *